United States Patent
Devireddy et al.

(10) Patent No.: US 6,519,679 B2
(45) Date of Patent: Feb. 11, 2003

(54) POLICY BASED STORAGE CONFIGURATION

(75) Inventors: Narayan Devireddy, Austin, TX (US); Xu Chen, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/330,302

(22) Filed: Jun. 11, 1999

(65) Prior Publication Data

US 2002/0133669 A1 Sep. 19, 2002

(51) Int. Cl.$^7$ .............................................. G06F 12/00
(52) U.S. Cl. ...................... 711/114; 711/150; 711/170
(58) Field of Search ................................ 711/114, 156, 711/161, 170; 713/1; 714/5, 11; 709/301, 212

(56) References Cited

U.S. PATENT DOCUMENTS

| | | | | |
|---|---|---|---|---|
| 5,479,653 A | * | 12/1995 | Jones ............................... | 714/5 |
| 5,519,844 A | | 5/1996 | Stallmo ........................ | 395/441 |
| 5,560,022 A | | 9/1996 | Dunstan et al. ............. | 395/750 |
| 5,598,549 A | | 1/1997 | Rathunde ..................... | 395/441 |
| 5,615,352 A | | 3/1997 | Jacobson et al. ........... | 395/441 |
| 5,659,704 A | | 8/1997 | Burkes et al. ............... | 395/441 |
| 5,666,512 A | | 9/1997 | Nelson et al. ............... | 711/114 |
| 5,696,934 A | | 12/1997 | Jacobson et al. ............ | 395/441 |
| 5,809,224 A | | 9/1998 | Schultz et al. .......... | 395/182.05 |
| 5,809,560 A | | 9/1998 | Schneider ................... | 711/204 |
| 5,813,009 A | * | 9/1998 | Johnson et al. ............. | 707/100 |
| 5,829,046 A | | 10/1998 | Tzelnic et al. .............. | 711/162 |
| 5,838,891 A | | 11/1998 | Mizuno et al. ......... | 395/182.03 |
| 5,838,907 A | | 11/1998 | Hansen ..................... | 395/200.5 |
| 5,907,324 A | | 5/1999 | Larson et al. ............... | 345/330 |
| 5,978,856 A | * | 11/1999 | Jones .......................... | 709/301 |
| 6,076,142 A | * | 6/2000 | Corrington et al. ......... | 711/114 |
| 6,078,990 A | * | 6/2000 | Frazier ........................ | 711/114 |
| 6,148,414 A | * | 11/2000 | Brown et al. ................. | 714/11 |
| 6,192,470 B1 | * | 2/2001 | Kelley et al. .................. | 713/1 |
| 6,314,460 B1 | * | 11/2001 | Knight et al. ............... | 709/212 |

OTHER PUBLICATIONS

"Configuring Compaq RAID Technology for Database Servers," White Paper, Doc. No. ECG011/0598, Database Engineering, Compaq Computer Corporation, May 1998, pp. 1–49.

* cited by examiner

Primary Examiner—Matthew Kim
Assistant Examiner—B. R. Peugh
(74) Attorney, Agent, or Firm—Hamilton & Terrile, LLP; Robert W. Holland

(57) ABSTRACT

A storage device configuration manager implemented in software for a computer system including a processor, a memory coupled to the processor, and at least one storage device coupled to the processor, can advantageously allow a user having relatively limited knowledge to configure storage devices for use with specific applications. The storage device configuration manager includes a user interface allowing for selecting, editing, deleting, and/or activating storage polices. The storage policies include information useful for configuring the storage device to operate efficiently with a particular application, or within a particular user environment.

23 Claims, 2 Drawing Sheets

POLICY BASED STORAGE CONFIGURATION

BACKGROUND OF THE INVENTION

1. Field of the Invention

This invention relates to storage devices for computer systems, and particularly the configuration of storage devices for computer systems.

2. Description of the Related Art

Computer systems generally, and servers in particular use a variety of magnetic, optical, and solid state storage devices in order to provide, process, and store data and applications software. In most user environments, it is very important for the storage devices to have high capacity, high performance, high reliability, and the ability to easily add storage. Since the primary storage device used by most computer systems is the hard disk drive, a great deal of effort has been expended in developing hard drive storage systems that possess all of the aforementioned attributes.

In general, a drive array is a collection of hard disk drives grouped together to create an array of physical drives. Drive array technology, typically in the form of a dedicated hardware controller, or controller software executing on a computer system's host processor, distributes data across one or more disk drives to combine these physical drives into one or more logical drives, which possess certain advantages (e.g., performance, reliability, capacity). Distributing the data across multiple disk drives makes it possible to access data concurrently from multiple drives in the array, yielding data transfer rates faster than non-arrayed drives. This technique for allowing a collection of drives to appear (and in some sense behave) as a single virtual disk or logical volume is often referred to as disk striping, or simply striping. The storage capacity of a striped array of disks is the sum of the capacities of the individual drives making up the array, less any space required for management of the array. An array using striping alone has at least one serious disadvantage, the failure of any one drive in the array leads to the failure of the entire volume.

For hard disk drives, and in some instances other magnetic and optical storage media, one of the more popular storage device systems to be developed in the last decade is the redundant array of inexpensive disks (RAID, sometimes described as a redundant array of independent disks). RAID systems use redundant information, stored on one or more drives to allow the array to survive the failure of one or more drives in the array. RAID storage technology provides several fault tolerance options, designated by a RAID level number, to protect data. It should be noted that the RAID level chosen, and thus the RAID configuration implemented, affects the performance, capacity, expandability, and cost of the storage system.

There are at least six common RAID levels (0–5). RAID Level 0 is, in essence, striping as previously described. Consequently, it is not redundant, and does not truly fit the "RAID" acronym. Since no redundant information is stored, performance is very good, but the failure of any disk in the array results in data loss. RAID Level 1 provides redundancy by duplicating all data from one drive on another drive, also referred to as mirroring. The performance of a level 1 array is only slightly better than a single drive, but if either drive fails, no data is lost. This is a good entry-level redundant system, since only two drives are required; however, since one drive is used to store a duplicate of the data, the cost per megabyte is high. RAID Level 2, which uses Hamming error correction codes, is intended for use with drives which do not have built-in error detection. All SCSI drives support built-in error detection, so this level is of little use when using SCSI drives. RAID Level 3 stripes data at a byte level across several drives, with parity information stored on one drive. It is otherwise similar to level 4. Byte-level striping requires hardware support for efficient use. RAID Level 4 stripes data at a block level across several drives, with parity information stored on one drive. The parity information allows recovery from the failure of any single drive. The performance of a level 4 array is very good for reads (the same as level 0). Writes, however, require that parity data be updated each time. This slows small random writes, in particular, though large writes or sequential writes are fairly fast. Because only one drive in the array stores redundant data, the cost per megabyte of a level 4 array can be fairly low. Finally, RAID Level 5 is similar to level 4, but distributes parity information among the drives. This can speed small writes in multiprocessing systems, since the parity disk does not become a bottleneck. Because parity data must be skipped on each drive during reads, however, the performance for reads tends to be considerably lower than a level 4 array. The cost per megabyte is the same as for level 4.

From this simple description of the various RAID levels, it can be seen that selection of a particular RAID level depends not only on the general properties desired by a user, but by the hardware resources available, and the user environment (e.g. type of server) in which the array is used. For example, RAID 0 might be desirable where the user is processing large, but temporary files because of that level's speed, and the application's relatively low need for failure protection. RAID 0 would not be the best choice for a database server precisely because there is no built-in failure protection.

Thus, it should be readily recognized by those having ordinary skill in the art that the process of selecting an appropriate RAID level for a particular application and implementing that level as a configuration of a storage device can be complex, requiring information about desired performance, available resources, and application details. Prior art storage management tools used for configuring and managing storage systems require users to have a great deal of knowledge about RAID technology, applications to be used in conjunction with a RAID implementation, and resources available. Accordingly, it is desirable to have an application based storage configuration solution to assist users with configuring and managing storage devices, particularly RAID devices.

SUMMARY OF THE INVENTION

It has been discovered that a storage device configuration manager implemented in software for a computer system including a processor, a memory coupled to the processor, and at least one storage device coupled to the processor, can advantageously allow a user having relatively limited knowledge to configure storage devices for use with specific applications. The storage device configuration manager includes a user interface allowing for selecting, editing, deleting, and/or activating storage polices. The storage policies include information useful for configuring the storage device to operate efficiently with a particular application, or within a particular user environment. The information is used by a policy engine to configure the storage device, thereby reducing the knowledge and effort required by a user. Additionally, the storage device configuration manager can provide a common interface for configuring a number of different RAID devices, even devices made by different manufacturers. Another advantage to the storage device configuration manager is that it provides a computer system manufacturer, vendor, or service organization a convenient mechanism for disseminating its expertise and experience associated with specific storage/application combinations.

Accordingly, one aspect of the present invention provides a storage device configuration manager for a computer system that includes a processor, a memory coupled to the processor, and at least one storage device coupled to the processor. At least a portion of the storage device configuration manager is software executable on the processor. The storage device configuration manager includes a user interface and a policy engine. The user interface is operable to allow a user to perform at least one of: creating a storage policy, selecting a storage policy, modifying a storage policy, deleting a storage policy, loading a storage policy into the memory, displaying contents of a storage policy, and causing a storage policy to be executed. The policy engine is operable to execute at least one command based on information from a storage policy. The at least one command for configuring the at least one storage device for operation.

In another aspect of the invention, a computer system includes a processor, a memory coupled to the processor, at least one storage device coupled to the processor, and a storage device configuration manager. The storage device configuration manager is at least partially executable on the processor and at least partially stored in the memory. The storage device configuration manager includes a user interface and a policy engine. The user interface is operable to allow a user to perform at least one of: creating a storage policy, selecting a storage policy, modifying a storage policy, deleting a storage policy, loading a storage policy into the memory, displaying contents of a storage policy, and causing a storage policy to be executed. The policy engine is operable to execute at least one command based on information from a storage policy. The at least one command for configuring the at least one storage device for operation.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
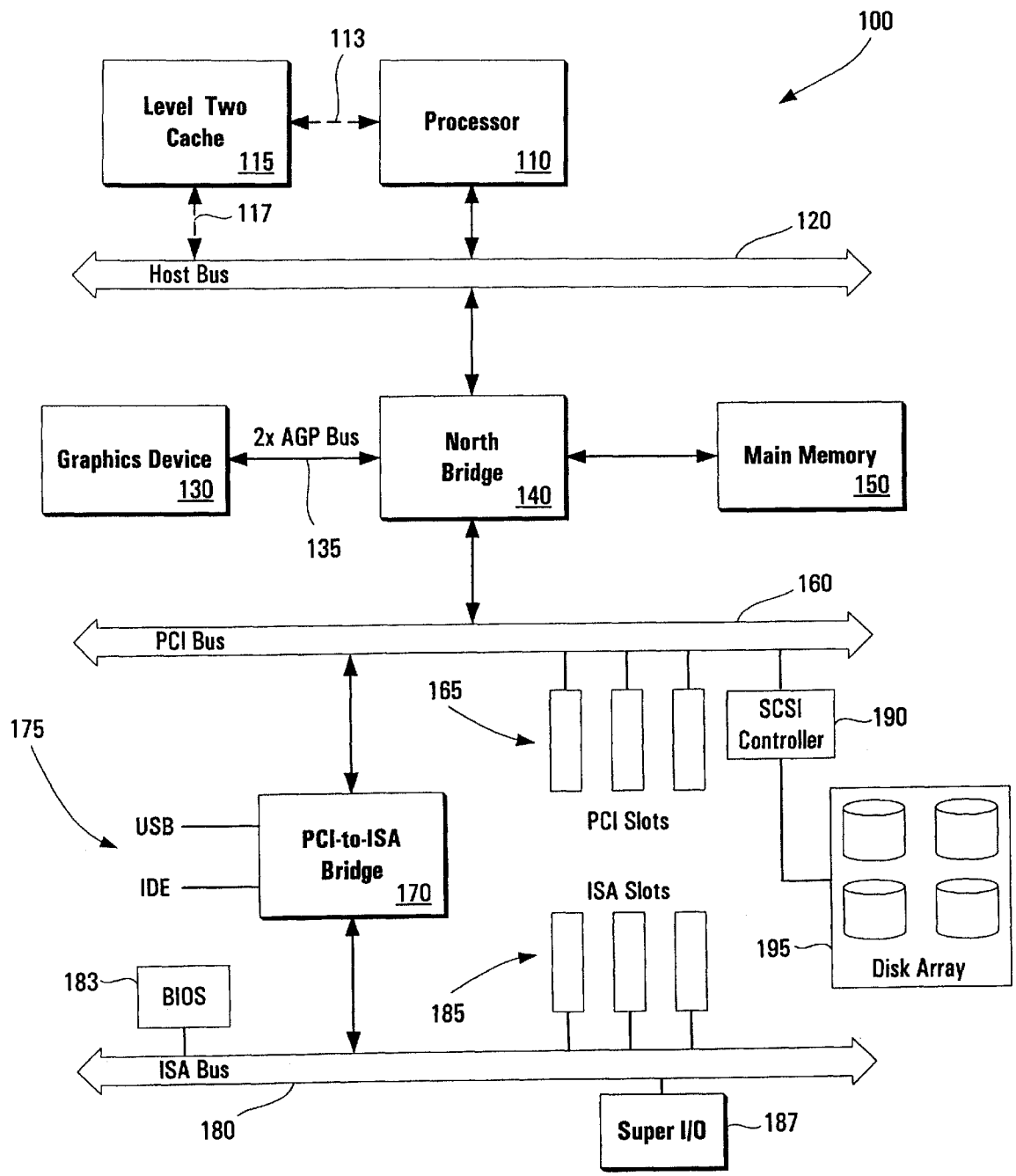
FIG. 1 is a block diagram of a computer system in which a storage device configuration manager can be implemented.

FIG. 1 illustrates a computer system 100 which is a simplified example of a computer system in which a storage device configuration manager can be implemented. Computer system 100 includes processor 110 which is coupled to host bus 120, although more than one processor can be utilized. A level two (L2) cache memory 115 is coupled to processor 110 through either host bus 120 (via connection 117) or back-side bus 113. North bridge (or host bridge) 140 is coupled to main memory 150, includes cache memory and main memory control functions, and provides bus control to handle transfers among PCI bus 160, processor 110, L2 cache 115, graphics device 130 (via AGP bus 135), main memory 150, and host bus 120. PCI bus 160 provides an interface for a variety of devices through PCI slots 165. PCI-to-ISA bridge 170 provides bus control to handle transfers between PCI bus 160 and ISA bus 180, IDE and universal serial bus (USB) functionality 175, and can include other functional elements not shown, such as power management functionality, a real-time clock (RTC), DMA control, interrupt support, and system management bus support. Peripheral devices and input/output (I/O) devices (e.g., IrDA devices, floppy disk drives, serial port devices, parallel port devices) can be attached to various interfaces such as ISA slots 185 coupled to ISA bus 180. Alternatively, many I/O devices can be accommodated by a super I/O controller 187 coupled to ISA bus 180. Additionally, BIOS 183 is coupled to ISA bus 180, and incorporates the necessary processor executable code for a variety of low-level system functions and system boot functions. High capacity storage devices such as disk array 195 (which can be a RAID device) are typically coupled to the computer system via a high speed interface such as SCSI controller 190 coupled to PCI bus 160. In addition to providing the communications interface, SCSI controller 190 can include a storage device controller for implementing a storage scheme such as RAID. Alternatively, storage scheme implementation can be provided by a storage device controller within disk array 195, or by software running on processor 110.

It should be noted that two approaches are commonly used to provide RAID capabilities for storage; these are typically referred to as hardware and software implementations, but can more accurately be referred to as controller-based and host-based implementations. RAID controllers labeled as hardware typically implement RAID capabilities using firmware or downloadable software running in a processor or microcontroller on a controller card. Host-based RAID implementations use software running on the computer system's host processor and memory provide control of the RAID devices. For example, many network operating systems include host-based RAID control. The RAID software takes I/O requests that are directed to array objects and decomposes them into separate request which are dispatched to the individual disk drives.

Figure 2:
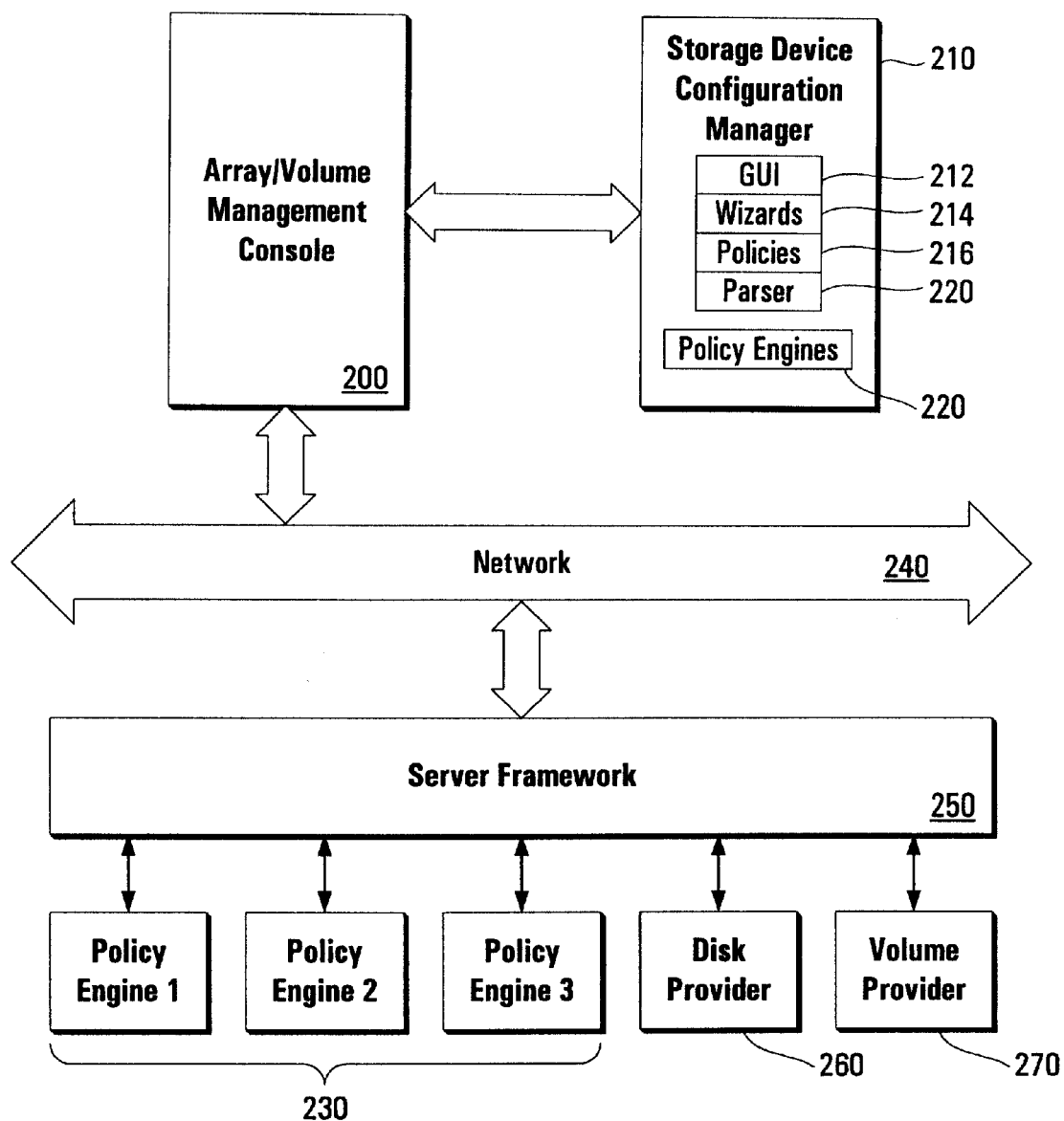
FIG. 2 is a block diagram illustrating a storage device configuration manager and its role in a server architecture.

A storage device configuration manager can be implemented in a computer system as a standalone application, or as illustrated in FIG. 2, a storage device configuration manager can be implemented as part of an overall storage management solution used to configure and manage some or all of the storage devices in a computer system.

Array/volume management console 200, typically implemented as software executable on a management workstation, enables users to manage and configure storage devices attached to the local host, and to remote hosts. Thus, storage device configuration manager 210 can be a component of the array/volume management console, or can operate in conjunction with console 200. Management functions performed through console 200 can include: displaying physical and logical objects in the storage system, performing operations related to each stored object, displaying information about each object, monitoring the health of the storage subsystem and alert notifications for any storage related events, and enclosure management (e.g. fans, power supplies, temperature probes, voltage probes).

One potential advantage of console 200 is a common user interface for all storage management and configuration needs. Array/volume management console 200, communicates with server framework 250 via network 240. Server framework 250 runs on a managed node and, together with console 200, implements a distributed database for the storage of a system model including objects, object hierarchies, and methods. Server framework 250, defines a common array model of storage objects. The model includes objects most commonly supported by storage devices such as storage control, physical disks, partitions of physical disks, array groups (e.g., arrays of disks controlled by particular controllers), and virtual disks constructed from members of an array group. Additionally, supported objects can be modified, added, or deleted. Server framework 250 is implemented as a system service of the operating system in use (typically a network operating system). Server framework 250 is also the conduit to service providers such as disk provider 260, volume provider 270, and policy engines 230. Providers are software modules (e.g. dynamic link libraries (DLLs)) specific to a particular piece of hardware (such as RAID controllers) and allow array/volume management console 200 and/or storage device configuration manager 210 to control, configure, and monitor storage devices.

Storage device configuration manager 210 provides storage device configuration using policies that include information for configuring the storage device for use with specific applications (e.g. a specific vendor's database server or mail server application), or generic applications and user environments (e.g. a generic database server, a generic mail server, high performance user environment, fault tolerant, etc.). This is accomplished using a user interface such as graphical user interface (GUI) 212 which allows for, inter alia, creating, selecting, modifying, deleting, loading, displaying, and causing the execution of storage policies 216. Storage policies are typically represented as configuration files including information needed to properly configure the storage device. In the case of RAID devices, that information can include virtual disk name, RAID type, virtual disk size, stripe size, read policy, cache size, write policy, and cache policy.

As part of GUI 212, or as a separate part of storage device configuration manager 210, wizards 214 can be used creating and editing policies. In general, wizards are specialized software tools to assist a computer system user in making choices regarding the characteristics of a document (e.g., a policy) or application being created by the user. Wizards are meant to further simply the user interface by operating between the user and an application program, and providing detailed information to the application program in response to relatively simple queries or options presented to the user.

Policy engines 220 and 230 represent software modules that interpret and execute policies. Because executing policies in the context of storage configuration requires knowledge about the details of hardware and/or software storage device implementation, policy engines 220 and 230 are typically specific to a particular vendor's device, such as a RAID controller card. At least conceptually, policy engines 220 and 230 are part of storage device configuration manager 210. However, in an actual implementation, a policy engine can be code that is local to and executed by a device controller. Moreover, different hardware device controllers may have different policy engines. Similarly, where storage control is implemented in a host-controller (e.g. soft RAID) execution of a policy engine can be on that controller (i.e. the host processor for the computer system). Alternatively, a policy engine can be an integral part of the code for storage device configuration manager 210, passing controller commands directly to the appropriate hardware or software controller.

In a simple example of a policy engine, the policy engine includes an EXECUTE_POLICY command that is passed to it by GUI 212 along with policy information. In still another example, storage device configuration manager 210 can include parser 218 as a separate element. Parser 218 can interpret a policy, and subsequently provide information directly to a policy engine for execution.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A storage device configuration manager for a computer system including a processor, a memory coupled to the processor, and at least one storage device coupled to the processor, at least a portion of the storage device configuration manager being software executable on the processor and comprising:
    a user interface operable to allow a user to perform at least one of: creating a storage policy, selecting a storage policy, modifying a storage policy, deleting a storage policy, loading a storage policy into the memory, displaying contents of a storage policy, and causing a storage policy to be executed;
    a policy engine operable to execute at least one command based on information from a storage policy, the at least one command for configuring the at least one storage device for operation;
    a parser operable to extract the information from a storage policy and provide it to the policy engine; and
    a host-based storage device controller at least partially executable on the processor and operable to execute at least a portion of the policy engine.

2. The storage device configuration manager of claim 1, wherein the user interface is a graphical user interface (GUI).

3. The storage device configuration manager for a computer system of claim 1 further comprising at least one wizard, the wizard operable to assist a user in performing at least one of creating a storage policy, selecting a storage policy, modifying a storage policy, deleting a storage policy, loading a storage policy into the memory, displaying contents of a storage policy, and causing a storage policy to be executed.

4. The storage device configuration manager for a computer system of claim 1 wherein the user interface is operable to provide the at least one command from a storage policy to the policy engine.

5. The storage device configuration manager for a computer system of claim 1 wherein the computer system includes a storage device controller coupled to the processor and the at least one storage device, and wherein at least a portion of the policy engine is software executable on the storage device controller.

6. The storage device configuration manager for a computer system of claim 5 wherein the policy engine is further operable to receive the information from a storage policy from the user interface.

7. The storage device configuration manager for a computer system of claim 5 wherein the at least a portion of the policy engine includes the parser operable to extract the information from a storage policy.

8. The storage device configuration manager for a computer system of claim 1 wherein the at least one storage device is a redundant array of inexpensive disks (RAID) device.

9. The storage device configuration manager for a computer system of claim 1 encoded in a computer readable medium as instructions executable on the processor, the computer readable medium being one of a magnetic storage medium, an optical storage medium, and a communications medium conveying signals encoding the instructions.

10. The storage device configuration manager for a computer system of claim 1 further composing at least one storage policy.

11. The storage device configuration manager for a computer system of claim 10 wherein the at least one storage policy includes at least one of a virtual disk name, a RAID type, a virtual disk size, a stripe size, a read policy, a cache size, a write policy, and a cache policy.

12. The storage device configuration manager for a computer system of claim 10 wherein the at least one storage policy includes at least one of an application specific storage policy and a generic storage policy.

13. A computer system comprising:

a processor:

a memory coupled to the processor;

at least one storage device coupled to the processor; and a storage device configuration manager at least partially executable on the processor and at least partially stored in the memory, the storage device configuration manager comprising:

a user interface operable to allow a user to perform at least one of: creating a storage policy, selecting a storage policy, modifying a storage policy, deleting a storage policy, loading a storage policy into the memory, displaying contents of a storage policy, and causing a storage policy to be executed;

a policy engine operable to execute at least one command based on information from a storage policy, the at least one command for configuring the at least one storage device for operation;

a parser operable to extract the information from a storage policy and provide it to the policy engine; and a host-based storage device controller at least partially executable on the processor, wherein at least a portion of the policy engine in executable by the host-based storage device controller.

14. The computer system of claim 13 further comprising a storage device controller coupled to the processor and the at least one storage device, at least a portion of the policy engine being software executable on the storage device controller.

15. The computer system of claim 13 wherein the policy engine is further operable to receive the information from storage policy from the user interface.

16. The computer system of claim 13 wherein the at least one storage device is a redundant array of inexpensive disks (RAID) device, the RAID device including at least one of a magnetic storage device, an optical storage device, and a solid state storage device.

17. The computer system of claim 13 wherein the storage device configuration manager is encoded in a computer readable medium as instructions executable on the processor, the computer readable medium being one of a magnetic storage medium, an optical storage medium, and a communications medium conveying signals encoding the instructions.

18. The computer system of claim 13 further composing at least one storage policy.

19. The computer system of claim 13 wherein the at least one storage policy includes at least one of an application specific storage policy and a generic storage policy.

20. The computer system of claim 13 wherein the at least one storage policy includes at least one of a virtual disk name, a RAID type, a virtual disk size, a stripe size, a read policy, a cache size, a write policy, and a cache policy.

21. The computer system of claim 13 wherein the user interface is a graphical user interface (GUI).

22. The computer system of claim 21 further comprising at least one wizard, the wizard operable to assist a user in performing at least one of creating a storage policy, selecting a storage policy, modifying a storage policy, deleting a storage policy, loading a storage policy into the memory, displaying contents of a storage policy, and causing a storage policy to be executed.

23. The computer system of claim 13 wherein the user interface is operable to provide the at least one command from a storage policy to the policy engine.

* * * * *